United States Patent
Egawa et al.

(10) Patent No.: US 7,154,925 B2
(45) Date of Patent: Dec. 26, 2006

(54) GAS LASER OSCILLATOR

(75) Inventors: Akira Egawa, Gotenba (JP); Minoru Ando, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 123 days.

(21) Appl. No.: 10/765,877

(22) Filed: Jan. 29, 2004

(65) Prior Publication Data
US 2004/0184504 A1    Sep. 23, 2004

(30) Foreign Application Priority Data
Jan. 31, 2003    (JP) ............................ 2003-023653

(51) Int. Cl.
*H01S 3/00*    (2006.01)
(52) U.S. Cl. .............................. 372/37; 372/55; 372/61
(58) Field of Classification Search .................... 372/37
See application file for complete search history.

(56) References Cited

U.S. PATENT DOCUMENTS

| | | | | |
|---|---|---|---|---|
| 3,521,193 | A | * | 7/1970 | Erf et al. ........................ 372/24 |
| 3,681,710 | A | * | 8/1972 | Lary et al. ..................... 372/37 |
| 4,604,752 | A | * | 8/1986 | Sequin et al. ............. 372/29.02 |
| 4,755,999 | A | * | 7/1988 | Macken ........................ 372/37 |
| 4,974,228 | A | * | 11/1990 | Petersen ...................... 372/37 |
| 5,450,435 | A | * | 9/1995 | Yamane et al. ................ 372/58 |
| 5,454,003 | A | * | 9/1995 | Murata et al. ................. 372/37 |

FOREIGN PATENT DOCUMENTS

| | | |
|---|---|---|
| EP | 0 492 340 A2 | 7/1992 |
| JP | 64-042187 | 2/1989 |
| JP | 1-202879 | 8/1989 |
| JP | 2-231779 | 9/1990 |
| JP | 4-307773 | 10/1992 |
| JP | 7-122798 | 5/1995 |
| JP | 2002-118312 | 4/2002 |

OTHER PUBLICATIONS

JPO Notice of Grounds for Rejection (Office Action) dated Jun. 14, 2005.

* cited by examiner

*Primary Examiner*—Minsun Oh Harvey
*Assistant Examiner*—Tod T. Van Roy
(74) *Attorney, Agent, or Firm*—Staas & Halsey LLP

(57) ABSTRACT

A gas laser oscillator of easy maintenance which is capable of switching a beam mode at high speed. Electric discharge sections in which gas medium is flown are formed in an optical resonating space in an electric discharge tube between a rear mirror and an output mirror. Electrodes are connected to electric discharge power sources (alternating current or direct current power sources). Coils are wound around the electric discharge tube at the respective electric discharge sections and excited by coil excitation circuits. Directions and intensities of the excitation currents from the coil excitation circuits are controlled by a controller. Regions in which the electric discharge currents flow between the electrodes in the respective electric discharge sections are varied by magnetic fields generated by the coils in accordance with the directions and intensities of the excitation currents of the coils, to thereby control the beam mode.

11 Claims, 6 Drawing Sheets

GAS LASER OSCILLATOR

BACKGROUND OF THE INVENTION

1. Field of the Invention

The present invention relates to a laser oscillator of an electric discharge pumping type of a gas laser medium for use in laser machining, medical treatment, illumination and communication, etc. and particularly to a laser oscillator having function of controlling a lateral mode (hereinafter referred to as beam mode) of a laser output.

2. Description of Related Art

There is known a gas laser oscillator for use in laser machining, medical treatment, illumination and communication, etc. having one or more electric discharge sections with electrodes each connected to an electric-discharge excitation power source. FIG. 6 schematically shows a typical example of such gas laser oscillator. In FIG. 6, an optical resonating space is formed between a rear mirror 4a of a total reflection mirror and an output mirror 4b of a partial reflection mirror. Two electric discharge sections 3a, 3b are provided in the optical resonating space.

The medium gas circulates along circulating paths through the optical resonating space by a blower 6. The medium gas discharged from the blower 6 passes through a heat exchanger 5a for removing compression heat and is supplied to the electric discharge sections 3a, 3b. The electric discharge sections 3a, 3b have electrodes 2a, 2b connected to electric-discharge excitation power sources 1a, 1b, respectively, for pumping the gas medium by electric discharge between the electrodes 2a, 2b to generate a laser beam. The generated laser beam is amplified by the optical resonator and outputted from the output mirror 4b. The gas medium heated by the electric discharge is cooled by the heat exchanger 5b to return to the blower 6.

In this example, two electric discharge sections 3a, 3b each having an electric discharge tube are excited by the respective power sources 1a, 1b. The power sources 1a, 1b supply alternating current and thus the electric discharges generated in the electric discharge sections 3a, 3b are alternating electric discharges.

Generally, a beam mode of the gas laser oscillator of this type is determined in dependence on an arrangement and a size of the laser resonator. For example, the beam mode changes in accordance with a length of the laser resonator, a sectional shape and a size of the electric discharge section. Further, in the case where an electric discharge tube is adopted for constituting the electric discharge section, factors determining the beam mode include an inner diameter of an aperture provided on an optical path (not shown in FIG. 6) as well as an inner diameter of the electric discharge tube and shapes of the electrodes. These factors are discussed in detail in JP 64-42187, for example.

The beam mode of the gas laser oscillator should be set in accordance with a use of the laser oscillator in practice such as machining, and it is desirable to appropriately control the beam mode to have characteristic suitable for the use of the laser oscillator in practice so as to cope with various uses.

There is known a technique of controlling the beam mode using an aperture as disclosed in EP 0492340A. In this technique, an aperture for restricting a beam diameter is inserted and retracted in an optical path of a laser resonator so as to change the beam mode. Mode change is realized between a $TEM_{00}$ mode (Gauss mode) or a low degree mode, and a $TEM_{01}^*$ mode (ring mode) or a high degree mode by switching a state of the aperture inserted on an optical axis and a state of the aperture retracted from the optical path.

This method of mechanically actuating the aperture generally has a problem in durability and low adaptiveness to a high speed control of the beam mode in view of response characteristic. Also, adjustment of an optical axis of the aperture is difficult to have difficulty in handling and maintenance.

Another technique of controlling the beam mode is known from JP 2002-118312A. In this document, an adaptive mirror (curvature variable mirror) is used for controlling the beam mode and the mode change is performed between two set states of mechanically variable curvature of the mirror. However, in this method of changing the curvature of the mirror also has problems in response characteristic and controllability as far as a shape of the mirror is mechanically varied and fails in solving difficulty in adjustment of an optical axis of the mirror. The function and structure of the adaptive mirror are described in detail in JP 3072519B.

SUMMARY OF THE INVENTION

The present invention provides a gas laser oscillator of easy maintenance capable of controlling a laser beam mode with high response and controllability.

A gas laser oscillator of the present invention comprises: an electric discharge section for generating electric discharge in gas laser medium for pumping the gas laser medium; a power source connected to said electric discharge section, for supplying electric discharge power thereto; and magnetic field applying means for applying magnetic field to said electric discharge section in a direction different from a direction of the electric discharge such that one of intensity and direction of the magnetic field is changeable to thereby change a lateral mode of an laser output.

The magnetic field applying means may include coils wound around the electric discharge section and direct-current coil excitation means for flowing direct current in the coils such that the intensity of the magnetic field applied to the electric discharge section is changeable by changing magnitude of the direct current.

The magnetic field applying means may include coils wound around said electric discharge section and alternate-current coil excitation means for flowing alternate current in the coils, such that the intensity of the magnetic field applied to said electric discharge section is changeable by changing magnitude of the alternate current. The magnetic field applying means may synchronize alternate magnetic field with alternate discharge current.

A plurality of electric discharge sections may be provided and said magnetic field applying means applies magnetic field in one of the plurality of electric discharge sections in a direction different from a direction of magnetic field in another of the plurality of electric discharge sections.

With the above arrangement of the gas laser oscillator, the beam mode is controllable by controlling intensity and direction of the magnetic field applied to the electric discharge section without using mechanical motion or deformation of the optical element. Thus, a beam mode controlling function having high controllability and operable at high speed and also easy handling and maintenance is realized without complicated structure. Thereby, the beam modes suitable for various uses are realized with ease to enable application to various uses.

BRIEF DESCRIPTION OF THE DRAWINGS

FIGS. 2a–2c are schematic cross-sections of an electric discharge section of the laser oscillator, in which FIG. 2a shows a force exerted on an electric discharge current in excitation of coils, FIGS. 2a and 2b show influences of the force on an electric discharge current which varies in accordance with a phase of an alternating electric-discharge excitation current and FIG. 2d shows a state of the electric discharge current in one cycle of the alternating electric-discharge current;

DETAILED DESCRIPTION

Figure 1:
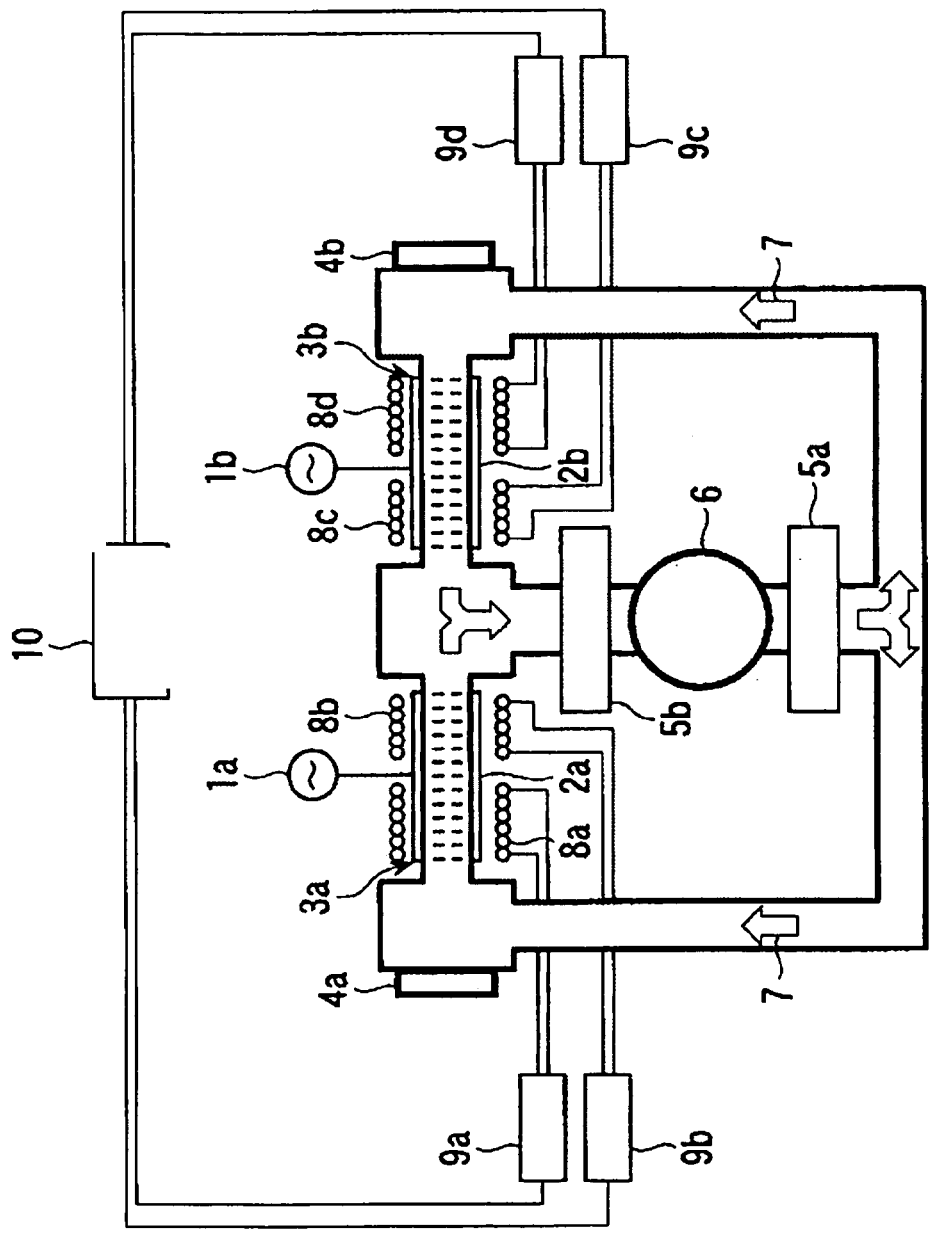
FIG. 1 is a schematic diagram of a laser oscillator according to an embodiment of the present invention.

Referring to FIG. 1, an optical resonating space is formed between a rear mirror 4a of total reflection mirror and an output mirror 4b having a partial reflection mirror and two electric discharge sections 3a, 3b for pumping gas laser medium are provided in the optical resonating space.

The electric discharge sections 3a, 3b have electrodes 2a, 2b respectively, and the electrodes 2a are connected with an electric discharge power source 1a and the electrodes 2b are connected with an electric discharge power source 1b. The electric discharge power sources 1a, 1b are alternating current power supply for supplying alternating power to the respective electric discharge sections 3a, 3b. The sources 1a, 1b are connected to a controller 10 so that ON/OFF and adjustment of the electric power to be supplied are performed.

The medium gas circulates along circulating paths through the optical resonating space by a blower 6 as shown by an arrow 7. The medium gas discharged from the blower 6 passes through a heat exchanger 5a, for removing compression heat, and is then supplied to the electric discharge sections 3a, 3b. In the electric discharge sections 3a, 3b, the medium gas is pumped by electric discharge between the electrodes 2a, 2b to generate a laser beam. The generated laser beam is amplified by the optical resonator and outputted from the output mirror 4b according to the well known principle. The gas medium heated by the electric discharge is cooled by the heat exchanger 5b to return to the blower 6.

Figure 6:
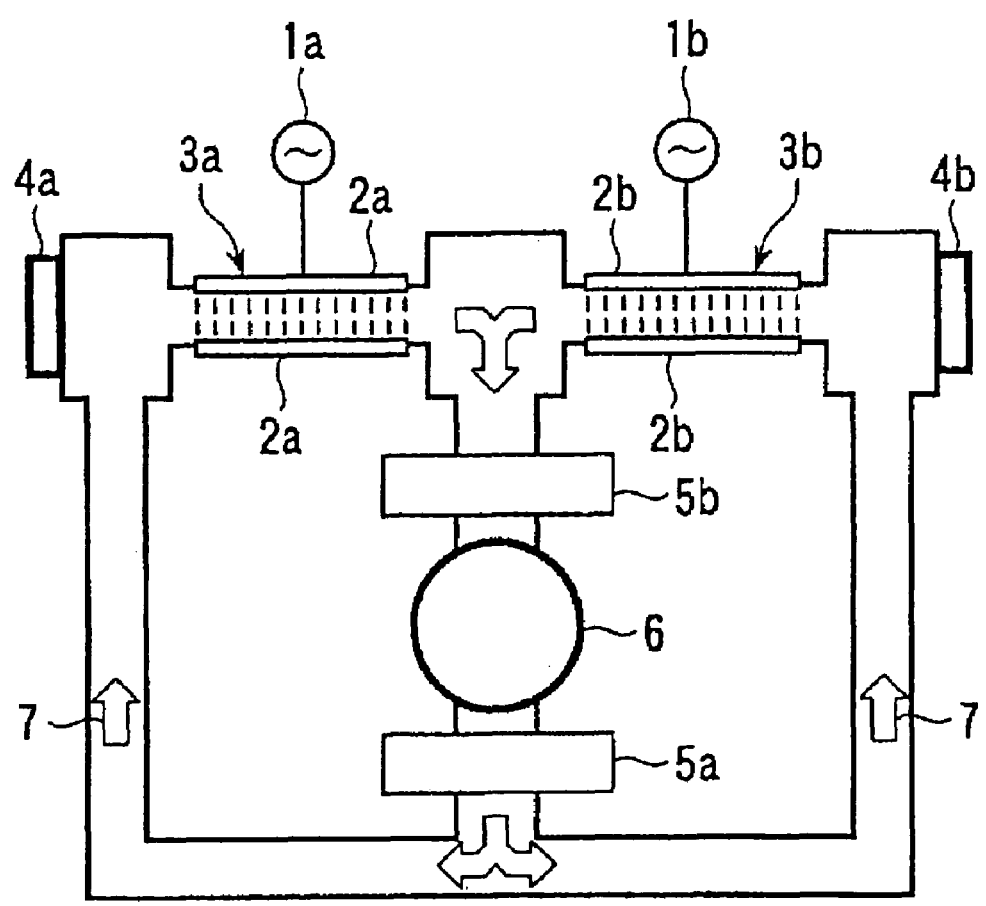
FIG. 6 is a schematic diagram of a typical example of a conventional gas laser oscillator.

The above described arrangement is not particularly different from the arrangement of the conventional laser oscillator as shown in FIG. 6. The present invention is featured in that coils 8a, 8b and 8c, 8d are arranged around electric discharge tubes constituting the electric discharge sections 3a and 3b respectively, and the coils 8a, 8b and 8c, 8d can be excited by coil exciting circuits 9a–9d, respectively. The coils 8a and 8b are arranged around the electric discharge tube constituting the electric discharge section 3a with an appropriate insulation space in between. Similarly, the coils 8c and 8d are arranged around the electric discharge tube constituting the electric discharge section 3b with an appropriate insulation space in between.

The coil exciting circuits 9a–9d for exiting the respective coils 8a–8d are connected to a controller 10 so that intensities and directions of exciting currents to be flown in the coils 8a–8d are respectively controlled. In this embodiment, direct currents are flown in the coils as the excitation currents. The excitation currents may be alternating currents, as described later.

Figure 2D:
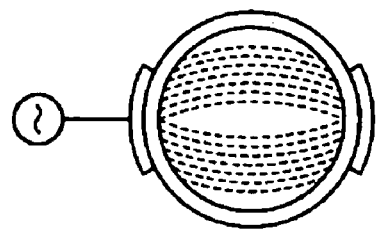
Figure 2C:
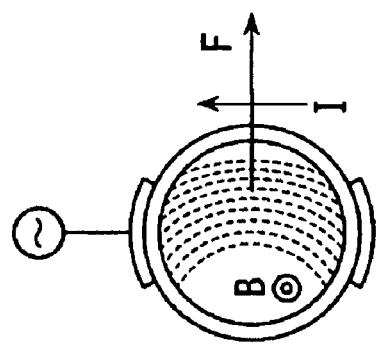
Figure 2B:
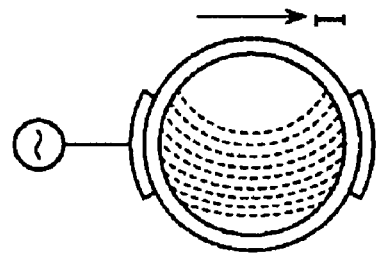
Figure 2A:
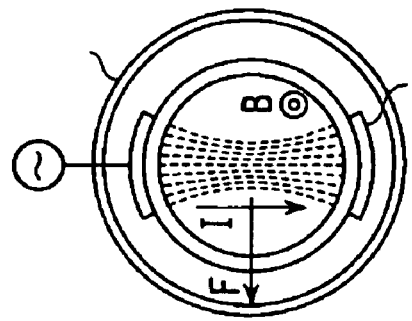

As shown in FIG. 2a, when the coils 8a–8d are excited by the direct currents, a magnetic flux B is generated in each of the electric discharge sections 3a and 3b in an axial direction of the electric discharge tubes. When an electric discharge (direct) current I flows from the upper side to the lower side in FIG. 2a, and an electromagnetic force F (=I×B) acts on the electric current I to generate the curved electric discharge as shown in FIG. 2b.

Since the alternate electric discharge is generated by excitation of the electric discharge power sources 1a, 1b in the electric discharge sections 3a, 3b, the direction of the electric discharge current changes alternately at each half cycle. Therefore, in the next half cycle, the direction of the force F is reversed to cause the electric discharge as shown in FIG. 2c. Thus, the electric discharge state in the whole cycle is spread toward outsides of the electric discharge tube as shown in FIG. 2d.

The beam mode in accordance with variation of the state of the electric discharge in the electric discharge section is influenced by widths of the electrodes. A general relation between widths of the electrodes of the electric discharge tube and the beam mode is disclosed in the above-mentioned JP 64-42187A. Referring to FIG. 3, how the beam mode is determined in accordance with the electric discharge state in the electric discharge tube will be described with respect to a case where widths of the electrodes are relatively narrow.

Figure 3A:
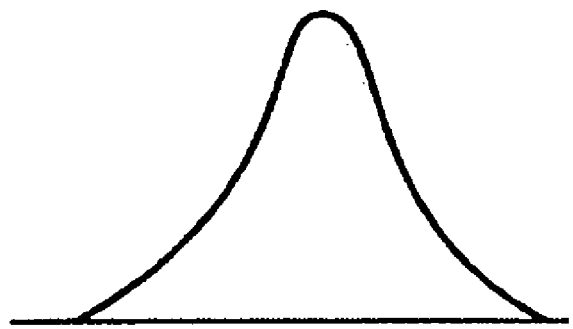
FIG. 3a is a diagram showing a beam mode under a condition of not applying a magnetic field.
Figure 3B:
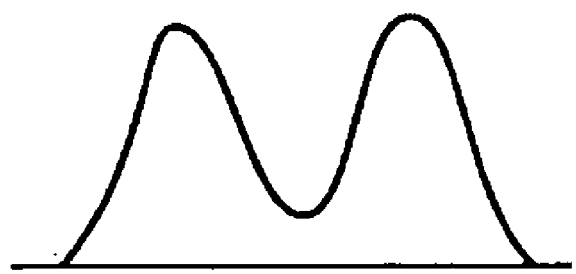
FIG. 3b is a diagram showing a beam mode under a condition of applying a sufficiently intense magnetic field in the laser oscillator.

In the case where the widths of the electrodes are relatively narrow, a beam mode approximate to the Gauss mode is obtained under no magnetic flux (B=0), as shown in FIG. 3a. When the magnetic filed (magnetic flux B) is applied to the electric discharge current to be spread as shown in FIG. 2d, the beam mode is changed. For example, when the coils are excited to generate a sufficiently intense magnetic flux (B=B1), a ring mode is obtained as shown in FIG. 3b.

Figure 4A:
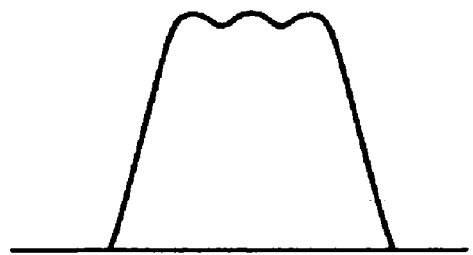
FIG. 4a is a diagram showing a beam mode under a condition of applying a relatively weak magnetic field.
Figure 4B:
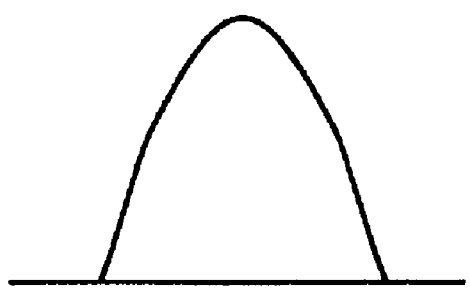
FIG. 4b is a diagram showing a beam mode under a condition of applying a medium magnetic field.
Figure 4C:
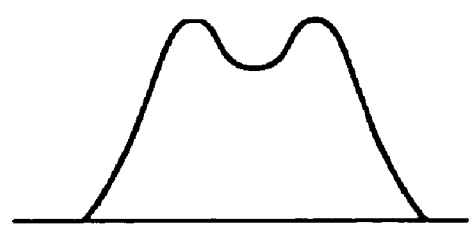
FIG. 4c is a diagram showing a beam mode under a condition of applying a relatively strong magnetic field.

When the intensity of magnetic flux B is varied between 0 and B1, various beam modes are obtained as shown in FIGS. 4a–4c. A beam mode in an approximately trapezoidal shape as shown in FIG. 4a is obtained under condition of a relatively low intensity of magnetic flux. A beam mode in a angled shape with protruding sides as shown in FIG. 4b is obtained under condition of a medium intensity of magnetic flux. A beam mode as shown in FIG. 4c is obtained under condition of a relatively high intensity of magnetic flux in transition to the ring mode as shown in FIG. 3b.

In the foregoing description, it is premised that excitation intensities of the coils 8a–8d in the electric discharge sections 3a, 3b are set equivalent. As occasion demands, an excitation intensity of the coils 8a, 8b of the electric discharge section 3a and the excitation intensity of the coils 8c, 8d of the electric discharge section 3b may be set different from each other. In this case, the mode of the laser beam generated by the pumping in the electric discharge section 3a and the mode of the laser beam generated by the pumping in the electric discharge section 3b are different and these modes are blended to realize a medium beam mode as a whole. Further, the excitation intensities of coils (e.g. the coil 8*a* and the coil 8*b*) in the same electric discharge section may be set different.

Figure 5:
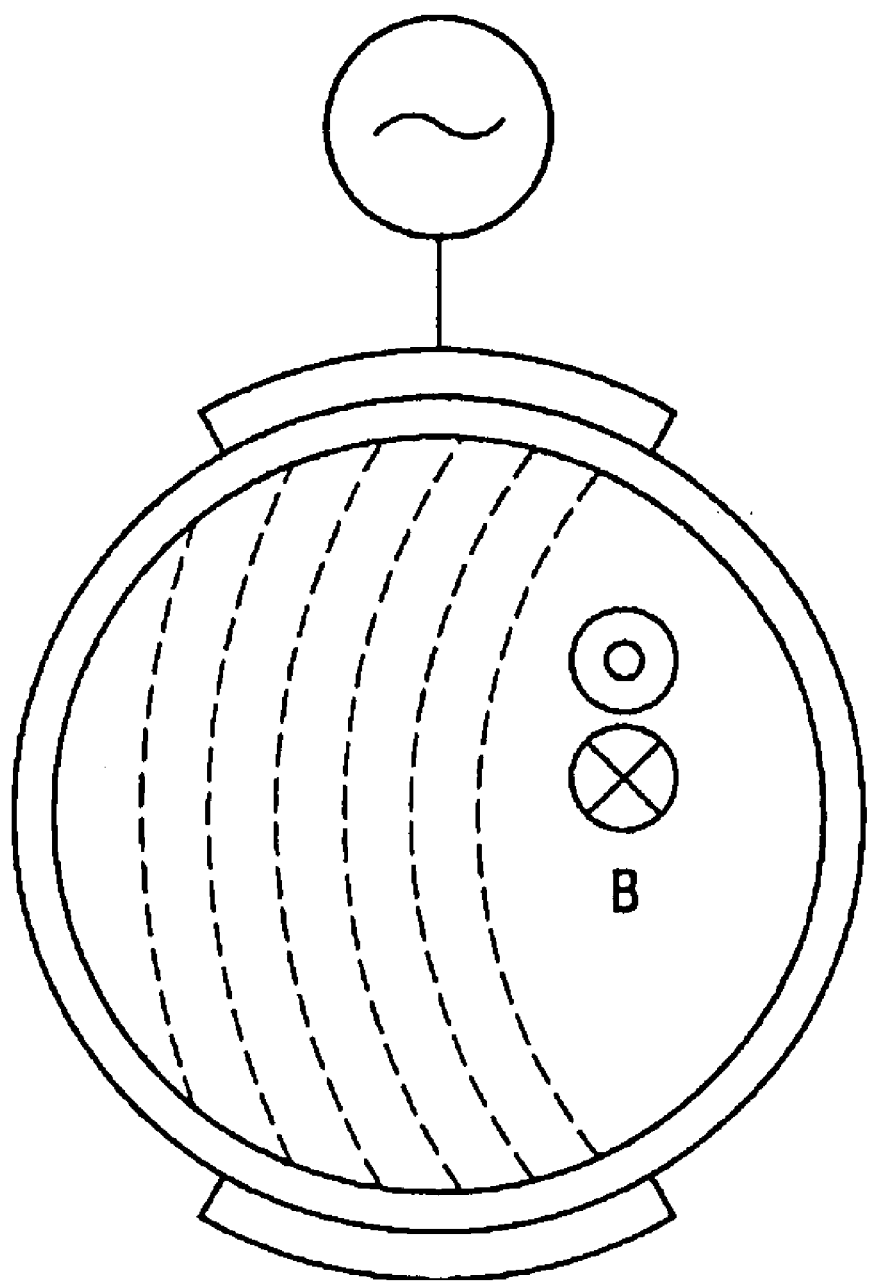
FIG. 5 is a schematic cross-section of the electric discharge section showing a state of an electric discharge current with spiral electrodes.

In the foregoing embodiment, the magnetic fields are generated by flowing the direct currents in the coils. In the case where the electrodes 2*a*, 2*b* are arranged spirally around the electric discharge tubes, the electric discharge power sources 1*a*, 1*b* and the coil excitation circuits 9*a*–9*d* may be synchronously controlled such that magnetic fields synchronized with the electric discharge currents are generated by flowing alternating current in the coils 8*a*–8*d* in the respective electric discharge sections 3*a*, 3*b*. In this case, the electric discharges are caused to bend in one direction, irrespective of the direction of the electric current (phase of the alternate current) in cross sections of the electric discharge tubes, as shown in FIG. 5. Since the bending direction of the electric discharge is continuously changed (turned) spirally with respect to position of the electric discharge in a longitudinal direction of the electric discharge tube, the beam modes as shown in FIGS. 4*a*–4*c* and FIG. 3*b* are attained in accordance with selectively varied intensities of the magnetic field.

Further, in the foregoing embodiment, the coils are respectively arranged at the two electric discharge sections so that excitation intensity of the respective coils are variable. The excitation intensity of the coils arranged at only one of the electric discharge sections may be variable. There is no restriction on the number of electric discharge sections and the number of electric discharge tubes and the number of power sources. For example, there may be provided one electric-discharge section, one electric discharge tube, one power source, or three electric discharge sections, three electric discharge tubes, three power sources. Further, two or more electric discharge sections may be excited by one power source. According to the present invention, it is essential that the magnetic field is generated in at least one electric discharge section.

The gas laser oscillator in the foregoing embodiment belongs to a type so called a high-speed axial flow laser. The gas laser oscillator of the present invention is not restricted to the high-speed axial flow laser but may be of other types of gas laser oscillator having electric discharge sections for performing gas electric discharge. For example, the present invention may be applied to a low-speed axial flow laser, a perpendicular two axes laser, a perpendicular three axes laser and a TEA (transversely-excited atmospheric) laser, etc. to obtain an equivalent effect to that in the high-speed axial flow laser.

Further, the description has been made for the case where the gas electric discharge is an alternating electric discharge. The same principle (i.e. applying magnetic field to the electric discharge current to control the electric discharge state) may be applied to a direct current electric discharge or a pulse electric discharge to obtain the same effect.

For instance, in the case of direct current electric discharge, a direct current pumping power source is adopted as the pumping power sources 1*a*, 1*b*. The direction of the magnetic field with respect to the direction of the electric discharge is set in the electric discharge sections 3*a*, 3*b* as shown in FIG. 2*a* to obtain the electric discharge as shown in FIG. 2*b*. A degree of bending of the electric discharge is controlled by controlling the intensity of the magnetic flux B.

Further, the electric discharge as shown in FIG. 2*b* and the electric discharge as shown in FIG. 2*c* are obtained by setting one of the direction of magnetic field and the direction of the electric discharge in the electric discharge section 3*a* opposite to one of the direction of magnetic field and the direction of the electric discharge in the electric discharge section 3*b*. In this case, the laser oscillation of the mode (e.g. the ring mode) equivalent to that obtained by the electric discharge as shown in FIG. 2*d* is obtained as a whole.

As described, since the laser oscillator according to the present invention performs control or switching of the laser beam mode by applying the magnetic field on the electric discharge for pumping without using mechanical motion or displacement of optical elements, a beam mode control function of high response and controllability is realized without complicated structure. Therefore, the beam modes suitable for various uses are realized with ease to enable application to various uses.

What is claimed is:

1. A gas laser oscillator, comprising:
an electric discharge section generating an electric discharge in a gas laser medium for pumping the gas laser medium;
a power source, connected to said electric discharge section, supplying electric discharge power thereto;
a magnetic field applying unit applying a magnetic field to said electric discharge section in a direction different from a direction of the electric discharge and selectively changing at least one of an intensity and a direction of the magnetic field thereby to change a lateral mode of an output of the gas laser oscillator; and
a plurality of electric discharge sections,
wherein said magnetic field applying unit applies the magnetic field in one of the plurality of electric discharge sections in a direction different from a direction of magnetic field in another of the plurality of electric discharge sections.

2. A gas laser oscillator according to claim 1, wherein said magnetic field applying means comprises:
coils wound around said electric discharge section; and
a direct-current coil excitation unit flowing direct current of a selectively changeable magnitude in the coils to apply a magnetic field of corresponding, selectively changeable intensity to said electric discharge section.

3. A gas laser oscillator according to claim 1, wherein said magnetic field applying unit comprises:
coils wound around said electric discharge section; and
an alternating-current coil excitation unit flowing alternating current of a selectively changeable magnitude in the coils, to apply a magnetic field of corresponding, selectively changeable intensity to said electric discharge section.

4. A gas laser oscillator according to claim 3, wherein said magnetic field applying unit synchronizes the magnetic field with the discharge current applied to the coils.

5. A gas laser oscillator according to claim 1, wherein:
the electric discharge section comprises an electric discharge tube to which the power source is connected by electrodes located at opposite sides of the discharge tube so that the electric discharge takes place between opposite sides of the discharge tube;
the magnetic field applying means includes coils wound around said electric discharge section and coil excitation means for causing current to flow in said coils in such manner as to produce a magnetic flux in said electric discharge section in an axial direction thereof, thereby to produce an electromagnetic force acting on the electric discharge in a direction transverse to the direction of the electric discharge.

6. A method of operating a gas laser oscillator having a gas laser medium in a plurality of electric discharge sections, comprising:

supplying alternating electric discharge power to the electric discharge sections to generate electric discharges in the gas laser medium for pumping the gas laser medium;

applying a magnetic field to the electric discharge sections in a direction different from a direction of the electric discharge and selectively changing at least one of an intensity and a direction of the magnetic field thereby to change a lateral mode of an output of the gas laser oscillator; and applying the magnetic field in one of the plurality of electric discharge sections in a direction different from a direction of magnetic field in another of the plurality of electric discharge sections.

7. The method as recited in claim 6, wherein:

the applying a magnetic field further comprises causing current to flow in coils wound around the electric discharge section so as to produce a magnetic flux in an axial direction in the electric discharge section and thereby produce an electric magnetic force acting on the electric discharge in a direction transverse to the direction of the electric discharge.

8. The method as recited in claim 6, further comprising:

maintaining the magnetic field during respective half cycles of the alternating energy, so as to create symmetrical, respective electric discharges which spread to corresponding, opposite outer sides of an electric discharge tube in each cycle.

9. The method as recited in claim 6, further comprising selectively changing the intensity of the magnetic field to a selected level, within a range from substantially no magnetic flux producing a beam mode approximating a Gauss mode, to an intense magnetic flux producing a ring mode.

10. The method as recited in claim 6, further comprising selectively changing the intensity of the magnetic field to a selected level within a range, from a relatively low level intensity producing a beam mode of an approximately trapezoidal shape to a medium level intensity producing a beam mode having an angled shape with protruding sides, to a higher medium level intensity producing a beam mode of a double peak shape, and to a maximum level intensity producing a beam mode of a ring mode.

11. The method as recited in claim 10, further comprising selectively changing the intensity of the magnetic field to a selected level, within a range from a relatively low level intensity producing a beam mode of an approximately trapezoidal shape to a medium level intensity producing a beam mode having an angled shape with protruding sides, to a higher medium level intensity producing a beam mode of a double peak shape, and to a maximum level intensity, producing a beam mode of a ring mode.

* * * * *

UNITED STATES PATENT AND TRADEMARK OFFICE
CERTIFICATE OF CORRECTION

PATENT NO.      : 7,154,925 B2
APPLICATION NO. : 10/765877
DATED           : December 26, 2006
INVENTOR(S)     : Akira Egawa et al.

It is certified that error appears in the above-identified patent and that said Letters Patent is hereby corrected as shown below:

Column 4, Line 51, after "mode in" change "a" to --an--.

Column 5, Line 31, change "electric-discharge" to --electric discharge--.

Signed and Sealed this

Eighth Day of May, 2007

JON W. DUDAS
*Director of the United States Patent and Trademark Office*